Patented Dec. 4, 1928.

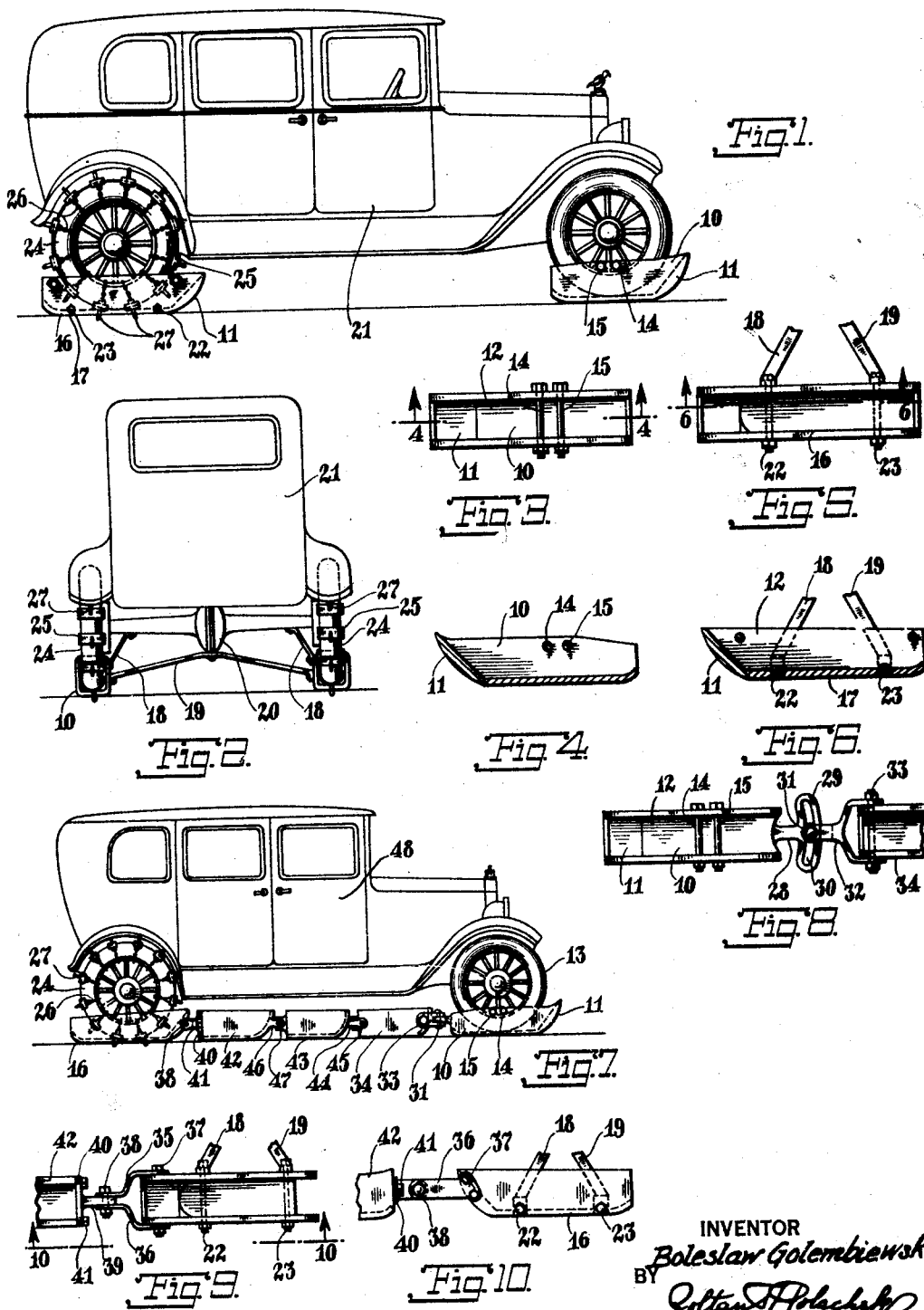
Dec. 4, 1928.  
B. GOLEMBIEWSKI  
1,694,215  
SLED RUNNER FOR AUTOMOBILES  
Filed Feb. 1, 1928

1,694,215

UNITED STATES PATENT OFFICE.

BOLESLAW GOLEMBIEWSKI, OF UTICA, NEW YORK.

SLED RUNNER FOR AUTOMOBILES.

Application filed February 1, 1928. Serial No. 250,966.

This invention relates to a new and useful attachment for motor vehicles especially adapted for the purpose of providing a means of traction for motor vehicles over snow, ice and slippery surfaces.

The object of the invention is to provide a new and novel arrangement of shoe members adapted to be attached to the front road wheels of the said motor vehicle and to the rear axle housing thereof.

A further object of the invention is to provide shoe members of simple construction, comparatively cheap to manufacture and readily appliable to a motor vehicle.

Fig. 1 is a side elevational view of a motor vehicle equipped with my improved shoe members constructed in accordance with my invention.

Fig. 2 is a rear elevational view thereof.

Fig. 3 is an enlarged top plan view of the front shoe member as embodied in my improved device.

Fig. 4 is a longitudinal sectional view taken on the line 4—4 of Fig. 3.

Fig. 5 is a top plan view of the rear shoe member as embodied in my improved device.

Fig. 6 is a longitudinal sectional view taken on the line 6—6 of Fig. 5.

Fig. 7 is a similar view to that shown in Fig. 1, illustrating a modification of my improved device.

Fig. 8 is a fragmentary top plan view of the front shoe member and the connected intermediate shoe member as embodied in my improved device.

Fig. 9 is a fragmentary top plan view of the rear shoe member and the connected intermediate shoe member.

Fig. 10 is a fragmentary side elevational view thereof.

As here embodied my improved device comprises a pair of front shoe members 10, curved as at 11, at the forward extremity thereof, and having formed therein a central longitudinal opening 12, extending in proximity to the forward extremity thereof, to the rear thereof, adapted to receive a portion of the front wheels 13. Bolts 14 and 15 are mounted in the front shoe members at or near the upper central portion thereof, as a means of securing the front shoe members to the said wheels of the motor vehicle.

A pair of rear shoe members 16, similar to the above described front shoe members, have formed therein an opening 17, positioned directly below the above mentioned opening 12, and extending in proximity to the forward extremity of the said rear shoe members to the rear thereof. Supports 18 and 19, brace rods or the like are secured to the rear axle housing 20, of the motor vehicle 21 and are extended angularly downwardly thereof and are secured, as at 22 and 23, to the rear shoe members, as a means of securely holding the said shoe members somewhat directly below the rear wheels 24 of the said motor vehicles. A plurality of gripping members 25 are secured as at 26, by chains or the like, to the rear wheels 24 and are provided with extended elements 27, adapted to grip the road surface when the said rear wheels are rotated or driven in the usual well known manner. The above described construction is such as will permit the said gripping members to extend somewhat through the openings 12 and 17 formed in the said rear shoe members so as to grip the road surface, as above set forth, as a means of propelling the said motor vehicle.

In Figs. 7 and 8 of the accompanying drawing, I have shown the front shoe members having secured thereto and extended from the rear thereof, brackets 28 provided with an arc shaped portion 29 having formed therein a similar shaped aperture 30 adapted to receive the bolt 31, carried in the bracket 32 pivotally secured as at 33, to the front intermediate shoe members 34 and extended from the forward portion thereof.

In Figs. 7, 9 and 10 of the accompanying drawing, I have shown a pair of brackets 35 and 36, secured as at 37 to the forward portion of the said rear shoe members and extended therefrom and pivotally secured as at 38, by bolts or the like carried in the extended elements 39 of the brackets 40 secured as at 41 to the rear portion of the rear intermediate shoe member 42. The central shoe members 43 have secured thereto, at the forward portions thereof brackets 44, extended thereof. Bolts 45 carried in the brackets 44 are secured to the rear portion of the front intermediate shoe members 34. Brackets 46 are secured to the rear portions of the central intermediate shoe members and are extended therefrom. Bolts 47 are carried in the brackets 46 and are secured to the forward portions of the rear intermediate shoe members.

The above described construction is such as will permit the motor vehicle 48 to be steered in the usual well known manner, and such as will permit the above mentioned intermediate shoe members to conform to the uneven surfaces of the road, and furthermore is such as will permit the said motor vehicle to be propelled by the hereinbefore described gripping members.

Having thus described my invention, what I claim as new and desire to secure by United States Letters Patent is:—

1. A sled runner attachment for automobiles, comprising front shoe members for attachment on the front wheels of a motor vehicle, and provided with rear projecting brackets having arc-shaped apertures, rear shoe members for attachment on the rear axle housing of the motor vehicle and for receiving the rear wheels of the vehicle, trains of intermediate shoe members pivotally connected for vertical movements on the fronts of the rear shoe members brackets pivotally connected for vertical movements on the fronts of the said trains of intermediate shoe members, and bolts connected on the brackets and engaging in the said arc-shaped apertures for permitting lateral movements of the front shoe members relative to the trains of intermediate members for steering purposes.

2. A sled runner attachment for automobiles, comprising front shoe members for attachment on the front wheels of a motor vehicle, and provided with rear projecting brackets having arc-shaped apertures, rear shoe members for attachment on the rear axle housing of the motor vehicle and for receiving the rear wheels of the vehicle, trains of intermediate shoe members pivotally connected for vertical movements on the fronts of the rear shoe members, the individual shoe members of said trains being pivotally connected with each other for vertical movements so as to permit shape changes of the trains for conforming with uneven surfaces of roads, brackets pivotally connected for vertical movements on the fronts of the said trains of intermediate shoe members, and bolts connected on the brackets and engaging in the said arc-shaped apertures for permitting lateral movements of the front shoe members relative to the trains of intermediate members for steering purposes.

3. A sled runner attachment for automobiles, comprising front shoe members for attachment on the front wheels of a motor vehicle, and provided with rear projecting brackets having arc-shaped apertures, rear shoe members for attachment on the rear axle housing of the motor vehicle, and for receiving the rear wheels of the vehicle, trains of intermediate shoe members attached on the fronts of the rear shoe members, the individual shoe members of said trains being pivotally connected with each other for vertical movements so as to permit shape changes of the trains for conforming with uneven surfaces of roads, brackets pivotally connected for vertical movements on the fronts of the said trains of intermediate shoe members, and bolts connected on the brackets and engaging in the said arc-shaped apertures for permitting lateral movements of the front shoe members relative to the trains of intermediate members for steering purposes.

4. A sled runner attachment for automobiles comprising front shoe members for attachment on the front wheels of a motor vehicle, and provided with rear projecting brackets having arc-shaped apertures, rear shoe members for attachment on the rear axle housing of the motor vehicle and for receiving the rear wheels of the vehicle, trains of intermediate shoe members pivotally connected for vertical movements on the fronts of the rear shoe members, the individual shoe members of said trains being pivotally connected with each other for vertical movements so as to permit shape changes of the trains for conforming with uneven surfaces of roads, brackets attached on the fronts of the said trains of intermediate shoe members, and bolts connected on the brackets and engaging in the said arc-shaped apertures for permitting lateral movements of the front shoe members relative to the trains of intermediate members for steering purposes.

In testimony whereof I have affixed my signature.

BOLESLAW GOLEMBIEWSKI.